United States Patent

Marsh et al.

[11] Patent Number: 5,728,947
[45] Date of Patent: Mar. 17, 1998

[54] ULTRASONIC VORTEX FLOWMETER HAVING CLAMP-ON HOUSING

[75] Inventors: David Winsor Marsh, N. Scituate, R.I.; Lars Oscar Rosaen, Plymouth; Eric J. Rosaen, Ann Arbor, both of Mich.

[73] Assignee: Asahi/America, Inc., Malden, Mass.

[21] Appl. No.: 662,037

[22] Filed: Jun. 12, 1996

[51] Int. Cl.$^6$ ........................................... G01F 1/32
[52] U.S. Cl. ............................................ 73/861.23
[58] Field of Search ........................... 73/861.28, 861.29, 73/861.23, 861.22, 637

[56] References Cited

U.S. PATENT DOCUMENTS

| | | | |
|---|---|---|---|
| 3,886,794 | 6/1975 | McShane | 73/194 B |
| 4,003,256 | 1/1977 | Donelan et al. | 73/861.27 |
| 4,164,143 | 8/1979 | Anderson | 73/194 |
| 4,240,299 | 12/1980 | Joy et al. | 73/861.23 |
| 4,286,470 | 9/1981 | Lynnworth | 73/637 |
| 4,318,303 | 3/1982 | Harrington | 73/861.23 |
| 4,372,166 | 2/1983 | Loveland | 73/861.28 |
| 4,375,768 | 3/1983 | Beck et al. | 73/861.23 |
| 4,457,181 | 7/1984 | Marsh | 73/861.22 |
| 4,567,776 | 2/1986 | Adachi | 73/861.23 |
| 4,718,283 | 1/1988 | Kamentser | 73/861.22 |
| 4,815,324 | 3/1989 | Tada et al. | 73/861.22 |
| 4,869,099 | 9/1989 | Takahashi et al. | 73/118.2 |
| 4,922,759 | 5/1990 | Steiner | 73/861.22 |
| 4,924,710 | 5/1990 | Inada et al. | 73/861.23 |
| 4,966,040 | 10/1990 | Ohmae | 73/861.22 |
| 4,970,902 | 11/1990 | Misumi et al. | 73/861.23 |
| 5,005,425 | 4/1991 | Ohmae | 73/861.22 |

FOREIGN PATENT DOCUMENTS

| | | |
|---|---|---|
| 54-121780 | 9/1979 | Japan . |
| 57-25141 | 5/1982 | Japan . |
| 64-78114 | 3/1983 | Japan . |
| 58-32333 | 7/1983 | Japan . |

*Primary Examiner*—Elizabeth L. Dougherty
*Assistant Examiner*—Jewel V. Artis
*Attorney, Agent, or Firm*—Anthony J. Casella; Gerald E. Hespos; Ludomir A. Budzyn

[57] ABSTRACT

An improved ultrasonic vortex fluid flowmeter (10) includes a housing (12) having a slip-on yoke (16) which removably mates with a bluff body conduit connector (18) permanently installed in a fluid conduit to be monitored. An ultrasonic transmitter (40) and receiver (42) are respectively positioned within the legs of the yoke so as pass an ultrasonic wave through vortices (43) shed by the fluid as it flows by the bluff body (28). The slip-on yoke eliminates both the need to shut down fluid flow during meter servicing, and the potential for external contaminants entering the fluid. The flowmeter further utilizes a simple phase detector formed from an Exclusive Or gate (44) in combination with an optimal phase range detecting means (108). The optimal phase range detecting means triggers a 90 degree phase shift whenever the phase difference between the transmitted wave and the received wave approaches 0 or 180 degrees.

18 Claims, 3 Drawing Sheets

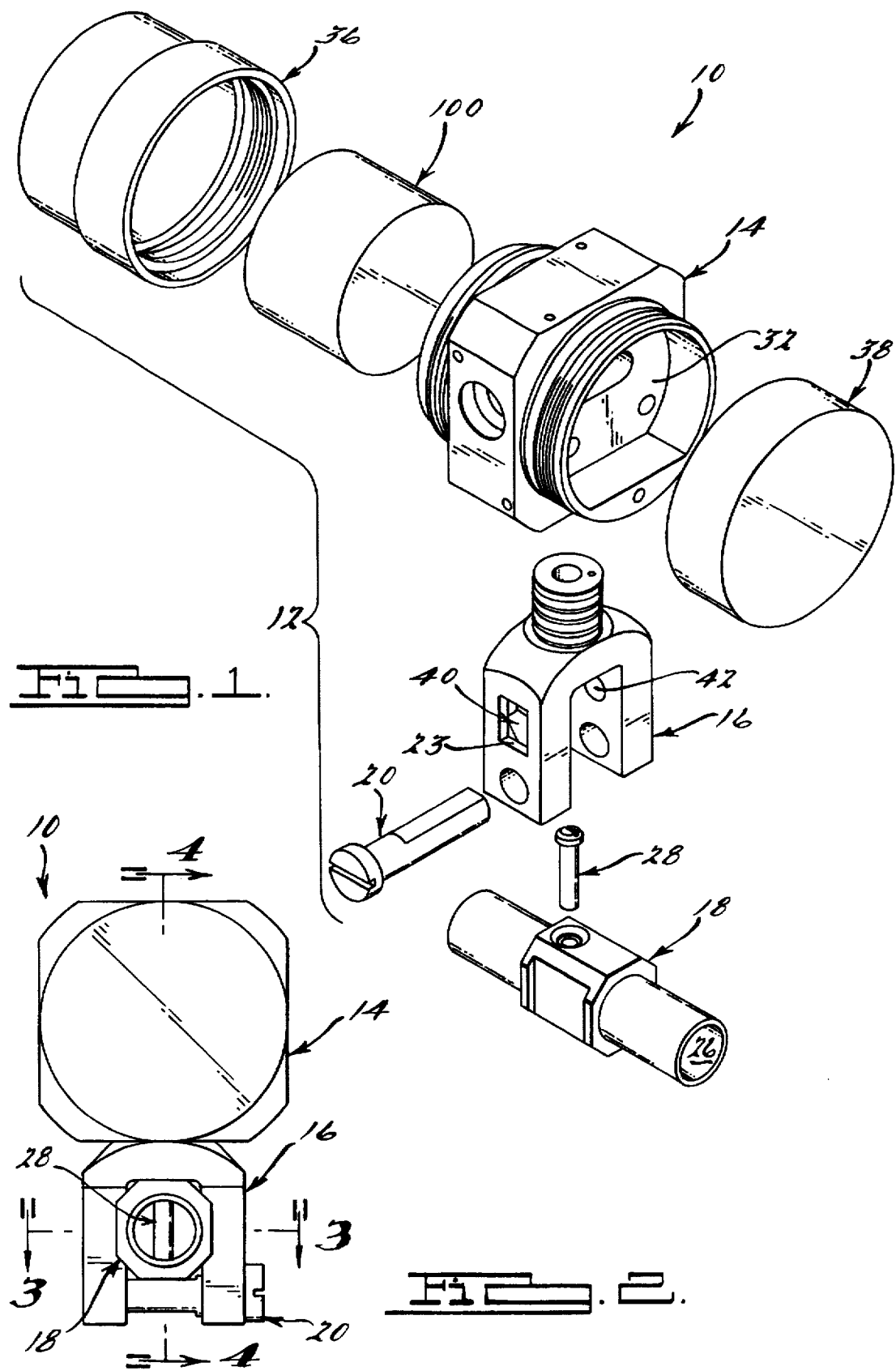

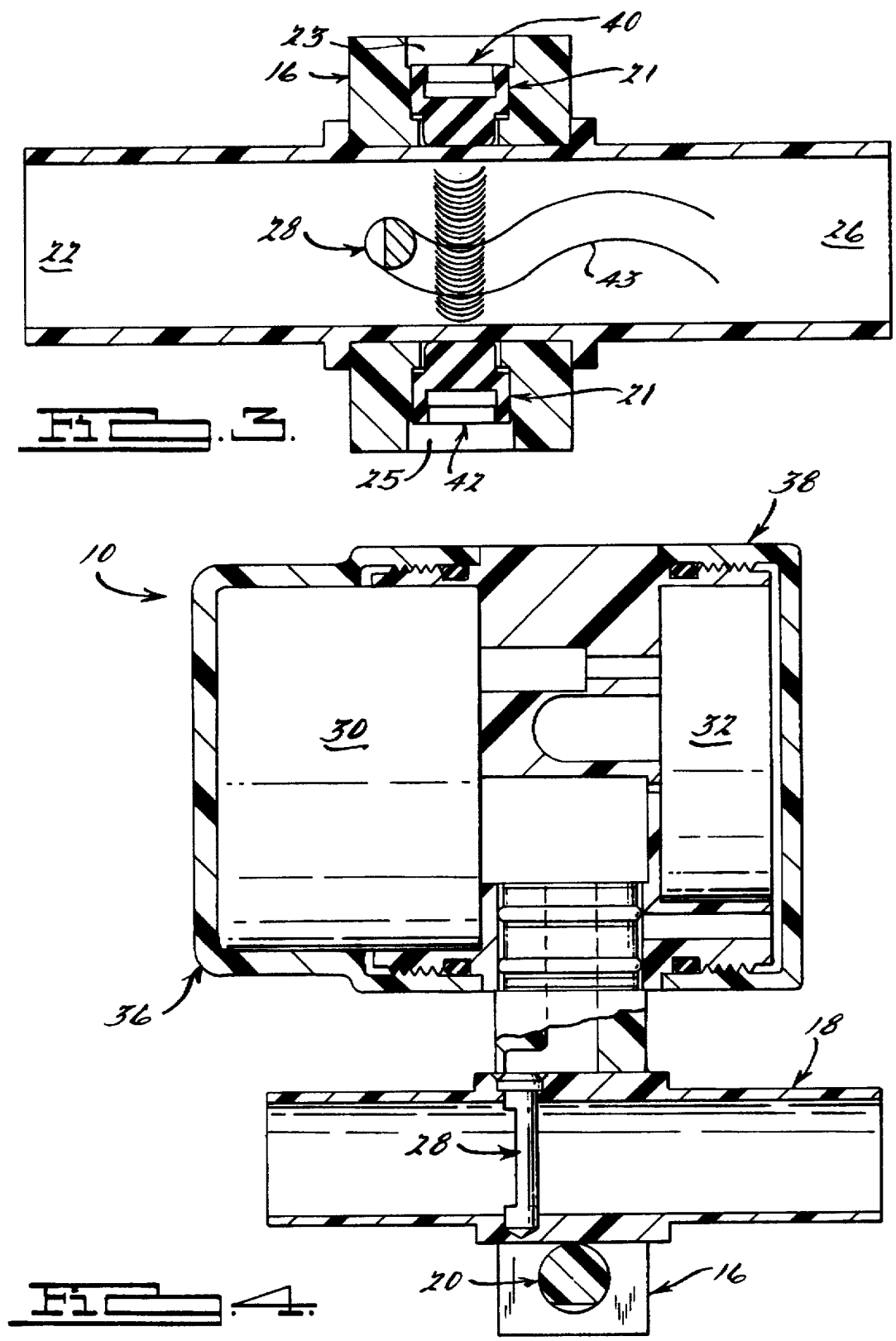

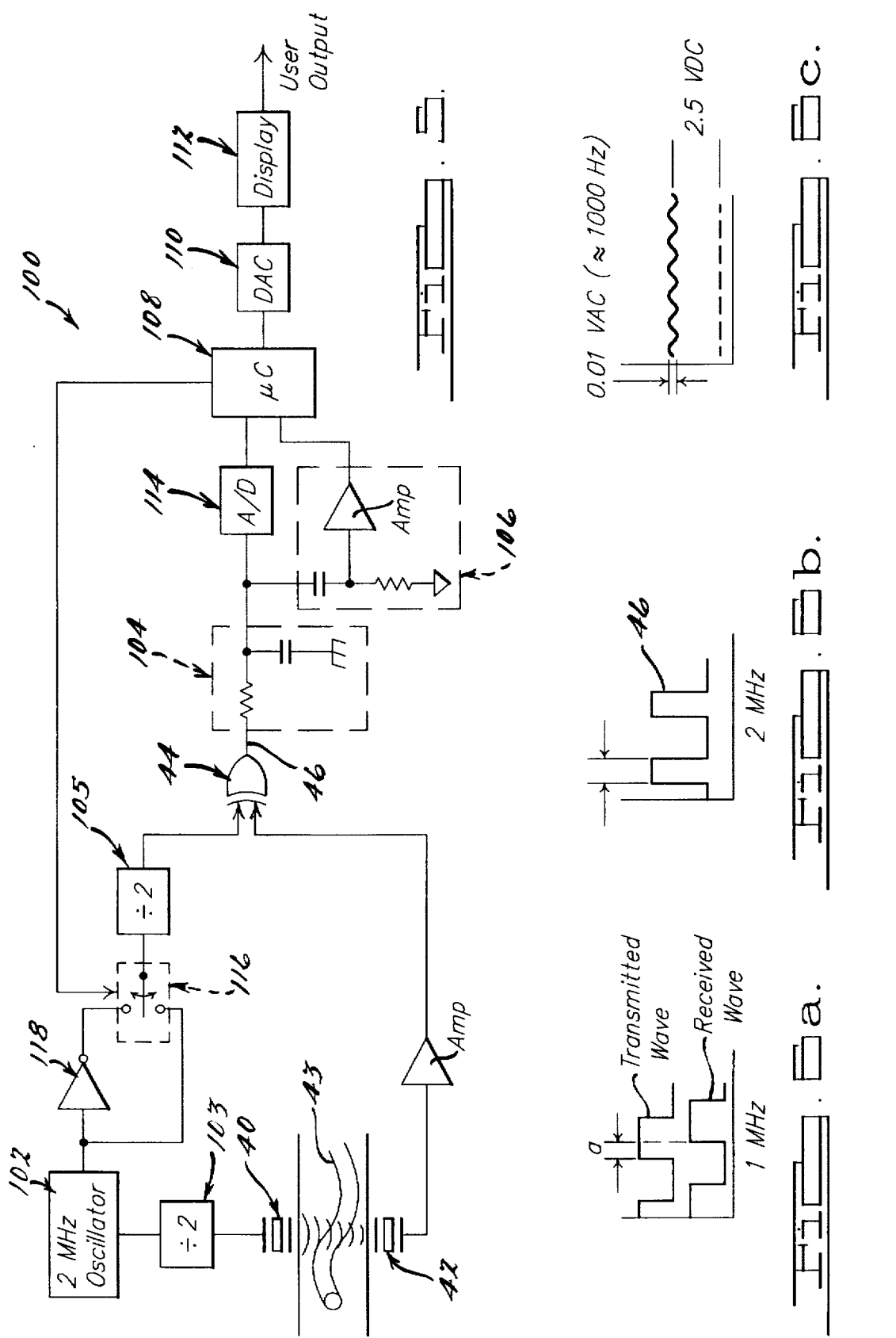

1

ULTRASONIC VORTEX FLOWMETER HAVING CLAMP-ON HOUSING

BACKGROUND OF THE INVENTION

The present invention relates to improvements in fluid flowmeters, and more particularly to vortex flowmeters of the type using ultrasonic sensing circuitry in conjunction with a bluff body disposed in a flow conduit.

Ultrasonic vortex flowmeters are generally well known, and operate on the theory that an obstruction, such as a bluff body, placed in a linear flow of fluid produces a plurality of vortices shed downstream from the obstruction. The vortices create localized oscillatory variations in observable flow parameters such as pressure or velocity. When the ultrasonic waves are transmitted through the vortices, the vortices produce a phase difference between the transmitted wave and the received wave which is dependent upon the strength and velocity of the vortices. These phase differences are subsequently detected and utilized to calculate the fluid flow rate.

However, phase differences may also be caused by other external phenomenon, such as temperature changes in the fluid, which can produce deviations in the phase between the transmitted and received waves exceeding the optimal range of the phase detector. As a result, known ultrasonic vortex flowmeters have typically utilized complex and expensive phase detection circuitry which attempts to force the phase difference to stay in an optimal detection range.

For example, one known arrangement utilizes a phase-lock loop (PLL) to slowly adjust either the frequency of the transmitted signal to maintain the optimum phase angle, or the frequency of the oscillator so as to be locked to the received signal. In addition to cost and complexity, the disadvantages of the PLL arrangements are their fallibility in handling large changes in the transmitted frequency caused by large temperature changes in the fluid, and the potential loss of lock and corresponding reacquisition time if the transmitted wave is interrupted such as by encountering an air bubble in the fluid. The reacquisition time can be especially problematic for large flowmeters, because the phase lock time constant must be longer than the lowest vortex shedding frequency, e.g., on the order of 1 Hz.

Other known ultrasonic vortex flowmeters have attempted to overcome the above-described phase corruption problem by utilizing multiple sets of transmitters and receivers. However, these arrangements only make the detection circuitry more complex and costly.

In addition to the problems with the phase detection circuitry, known flowmeter arrangements have also suffered from the drawback that due to housing designs, any servicing of the flowmeter has necessitated the disconnection of the unit from the fluid conduit. Such disconnection is highly undesirable because it typically requires a temporary shutting down of the manufacturing process which relies on the fluid flow so that the flow of fluid may be stopped. Moreover, the uncoupling of the flowmeter from the conduit may allow external contaminants to enter the conduit, thereby further disrupting the manufacturing process, or potentially compromising the quality of the manufactured goods.

SUMMARY OF THE INVENTION

Therefore, an object of the present invention is to provide a ultrasonic vortex flowmeter which is can utilize a simple, inexpensive, and reliable phase detector.

Another object of the present invention is to provide an ultrasonic vortex flowmeter which can be serviced by a technician without dismantling the fluid distribution system, and without potentially exposing the fluid to external contaminants.

Yet another object of the present invention is to provide an ultrasonic vortex flowmeter which includes a housing arranged to permit removal of the flow sensor component without interrupting the flow of fluid in the fluid distribution system.

Still another object of the present invention is to provide an ultrasonic vortex flowmeter having a housing made entirely of noncorrosive material, and which is slipped around a fluid flow conduit or pipe.

In accordance with these and other objects, the present invention provides an improved ultrasonic vortex fluid flowmeter having a housing comprising a slip-on yoke which removably mates with a bluff body conduit connector permanently installed in a fluid conduit to be monitored. An ultrasonic transmitter and receiver are respectively positioned within the legs of the yoke so as pass an ultrasonic wave through vortices shed by the fluid as it flows by the bluff body located within the bluff body conduit connector. The slip-on yoke eliminates both the need to shut down fluid flow during meter servicing, and the potential for external contaminants entering the fluid. The flowmeter further utilizes a simple phase detector formed from an Exclusive Or gate in combination with an optimal phase range detecting arrangement. The optimal phase range detecting arrangement triggers a 90 degree phase shifting means whenever the phase difference between the transmitted wave and the received wave approaches 0 or 180 degrees.

Thus, in accordance with a first aspect of the present invention, a vortex flowmeter comprises a housing connected about a fluid flow conduit, means disposed within the conduit for generating vortices in the flow of fluid, a transmitter positioned within the housing for propagating an ultrasonic wave through the vortices, and an ultrasonic receiver positioned within the housing for receiving the propagated wave. A phase detector means is connected to the transmitter and receiver for producing an output representative of any phase difference between the transmitted wave and the received wave, and a processor means is responsive to the phase detector means output for determining the fluid flow rate as a function of the phase difference caused by the vortices. An optimal phase range detecting means is connected to the phase detector means for detecting if the phase difference is approximately 0 degrees or 180 degrees, and a phase shifting means is responsive to the optimal phase range detecting means for shifting the phase of the transmitter signal supplied to the phase detecting means by substantially 90 degrees whenever the phase difference is approximately 0 or 180 degrees.

In accordance with a second aspect of the present invention, a vortex flowmeter comprises a housing having a yoke dimensioned to slip about a separate bluff body conduit connector coupled to a fluid flow conduit. The bluff body is disposed so as to produce vortices in the fluid flow. An ultrasonic transmitter and receiver are disposed within the yoke so as to be respectively positioned on opposing sides of the bluff body conduit connector. The transmitter is positioned to propagate an ultrasonic wave through the vortices for receipt by the receiver. A phase detector means is connected to the transmitter and receiver for producing an output representative of any phase difference between the transmitted wave and the received wave, and a processor means is responsive to the phase detector means output for determining the fluid flow rate as a function of the phase difference caused by the vortices.

The present invention will be more fully understood upon reading the following detailed description of the preferred embodiment in conjunction with the accompanying drawings.

BRIEF DESCRIPTION OF THE DRAWINGS

FIG. 1 is a perspective view of an ultrasonic vortex flowmeter in accordance with the present invention;

FIG. 2 is a front, longitudinal view of the flowmeter of FIG. 1;

FIG. 3 is a cross-sectional view taken along the line 3—3 of FIG. 2;

FIG. 4 is a cross-sectional view taken along the line 4—4 of FIG. 2;

FIG. 5 is a block diagram schematic for a flowmeter processing circuit in accordance with the present invention; and FIGS. 6(a)-(c) are plots illustrating the signals processed at various points in the circuit of FIG. 5.

DETAILED DESCRIPTION OF THE PREFERRED EMBODIMENT(S)

Referring to FIGS. 1-4, an ultrasonic vortex flowmeter 10 is shown in accordance with the present invention as having a housing 12 formed from a meter head 14 pivotally mounted to a slip-on yoke 16. The yoke 16 is arranged to slip-on and mate with a separate bluff body conduit connector 18, and is held in place by way of a locking cam pin 20. In addition, a pair of rubber bushings 21 are respectively positioned within cavities 23 and 25 formed on opposite sides of the inside of the yoke 16, and are arranged to extend slightly outward from the inner yoke surface so as to provide a friction fit between the yoke 16 and bluff body conduit connector 18 once the yoke 16 has been slid thereabout.

The bluff body conduit connector 18 is arranged to be fitted to a desired fluid conduit or pipe during an initial installation, after which the fluid whose flow rate is to be monitored passes through a first open end 22 into a bluff body flow passage 24, and finally flows out via a second open end 26 located opposite the first end 22. At least one bluff body 28 is affixed to the conduit connector 18 so as to be positioned to extend internally within the passage 24.

The meter head 14 is arranged in accordance with the present invention to provide two isolated circuit compartments 30 and 32. The first compartment 30 houses the sensor circuitry (described hereinbelow in connection with FIG. 5) and is sealed shut after installation by cover 36. The second compartment 32 is closed with a removable cover 38, and houses various field connections which are typically accessed after flowmeter installation to allow connection of the flowmeter output to external monitoring and control circuitry. All components of the flowmeter housing are made from noncorrosive materials, such as nylon, Teflon®, PVC, PVDF, or other suitable plastic. The use of plastics allows the flowmeter of the present invention to be resistant to corrosion, acid, and most solvents, and thereby well suited for use in hostile industrial manufacturing environments.

Positioned adjacent the rubber bushings 21 within each respective cavity 23 and 25 are an ultrasonic transmitter 40 and receiver 42. As best seen in FIG. 3, when the yoke is properly mounted to the bluff body conduit connector 18, the transmitter and receiver will be positioned in such a way so as to pass an ultrasonic signal through the vortices 43 shed when the fluid flowing within the bluff body passage 24 impacts with the bluff body 28, as is well understood by one having ordinary skill in the art. The vortices 43 create a phase difference between the transmitted wave and the received wave which are detected by a phase detector circuit, such as an Exclusive Or gate 44, more fully described hereinbelow in context with a flowmeter processing circuit 100 shown in FIG. 5.

More specifically, as shown in FIG. 5, the processing circuit 100 includes an oscillator 102 for producing a reference wave, such as having a frequency of 2 MHz. The reference wave is than divided, such as by a divide by 2 divider 103, and fed to the transmitter 40 to generate the transmitted wave. The output of the oscillator 102 is also supplied to one of the inputs of the Exclusive Or gate 44 via a second divider (shown as divide by 2 divider 105), while the output of the receiver 42 is supplied to the other input of the Exclusive Or gate 44. As shown in FIG. 6(b), the Exclusive Or gate 44 subsequently produces an output 46 comprised of a series of pulses having a width which is a function of the phase difference between the transmitted wave and the received wave shown as "a" in FIG. 6(a).

The output of the Exclusive Or gate 44 is filtered by a low-pass filter 104 having a cut-off frequency lower than the frequency of the carrier wave, but higher than the frequency of the vortex shedding. The low-pass filter 104 effectively removes the carrier wave from the phase detector output. Thus, by way of an exemplary embodiment shown in FIG. 6(c), if a standard CMOS type Exclusive Or gate is utilized, the output of the low-pass filter 104 will comprise a DC voltage component which varies between 0 and 5 VDC corresponding to the varying phase difference, and a small AC voltage component whose frequency is a function of the flow velocity of the fluid. A high-pass filter 106 separates the AC voltage component for input to a control processor 108. The control processor 108 processes the AC component for output to a digital-to-analog convertor (DAC) 110. The output of the DAC 110 is supplied to a suitable fluid flow rate display 112 or other external monitoring equipment.

In accordance with the present invention, in order to compensate the inability of the Exclusive Or Gate 44 to produce an output when the phase difference between the transmitted wave and the received wave is substantially 0 or 180 degrees, the control processor 108 monitors the amplitude of the DC component of the Exclusive Or gate output via an analog-to-digital (A/D) converter 114 to determine when the phase difference is essentially 0 or 180 degrees. For example, in the exemplary arrangement noted above, when the phase difference is in an optimal range, the amplitude of the DC component with be 2.5 VDC, and when the phase difference is substantially 0 or 180 degrees, the amplitude of the DC component will respectively be 0 or 5 VDC. When the processor 108 detects the phase difference either at or approaching 0 or 180 degrees, the processor 108 activates a switch 116 to cause the oscillator/transmitter input to the Exclusive Or gate to be inverted by an invertor 118. Due to the divider 105, this switching arrangement effectively produces a 90 degree shift in the transmitter input to the Exclusive Or gate 44, which in turn maintains the phase difference between the transmitted and received wave in the optimal phase detection range.

Thus, the ultrasonic vortex flowmeter 10 of the present invention achieves significant advantages over conventional fluid flowmeters. Specifically, the slip-on yoke can be unlatched to allow quick removal, replacement, and servicing of the flowmeter without ever opening up the fluid conduit, thereby eliminating the possibility of external contaminants entering the fluid when the flowmeter requires is servicing. Further, the monitoring for any deviations from an optimal phase difference detection range and the subsequent 90 degree phase shifting compensation arrangement of the present invention allows the present invention to utilize a simple, reliable, and inexpensive Exclusive Or gate as a phase detector. And finally, because the flowmeter head is arranged to isolate the individual compartments for the flowmeter circuitry and the field connections, the need for field personnel to directly access and expose the flowmeter circuitry after installation simply to connect external monitoring or other control equipment is eliminated.

It will be understood that the foregoing description of the preferred embodiment of the present invention is for illustrative purposes only, and that the various structural and operational features herein disclosed are susceptible to a number of modifications, none of which departs from the spirit and scope of the present invention as defined in the appended claims.

We claim:

1. A vortex flowmeter comprising:
   a housing connected about a fluid flow conduit;
   means disposed within said conduit for generating vortices in the flow of fluid;
   a transmitter positioned within said housing for propagating an ultrasonic wave through said vortices;
   an ultrasonic receiver positioned within said housing for receiving said propagated wave;
   a phase detector means connected to said transmitter and receiver for producing an output representative of any phase difference between the transmitted wave and the received wave;
   processor means responsive to said phase detector means output for determining the fluid flow rate as a function of the phase difference caused by said vortices;
   an optimal phase range detecting means connected to said phase detector means for detecting if said phase difference is approximately 0 degrees or 180 degrees; and
   a phase shifting means connected to said optimal phase range detecting means for shifting the phase of the transmitter signal supplied to said phase detecting means by substantially 90 degrees.

2. The vortex flowmeter of claim 1 wherein said phase detecting means comprises an Exclusive Or gate having an output connected to a means for filtering said output into a DC component representative of the phase difference between the transmitted and received waves, and an AC component representative of the frequency of said vortices.

3. The vortex flowmeter of claim 2 wherein said optimal phase range detecting means is responsive to the amplitude of said DC component to determine if said phase difference is approximately 0 or 180 degrees.

4. The vortex flowmeter of claim 2 wherein said phase shifting means comprises a means for inverting said transmitter signal supplied to said phase detecting means, and a frequency divider for dividing said inverted signal by 2.

5. The vortex flowmeter of claim 1 wherein said housing comprises a yoke dimensioned to slip about a bluff body conduit connector coupled to said fluid flow conduit.

6. The vortex flowmeter of claim 5 wherein said yoke is removably fastened about said bluff body conduit connector by a locking mechanism.

7. The vortex flowmeter of claim 5 wherein said transmitter and receiver are mounted within said yoke so as to be respectively positioned on opposing sides of said bluff body conduit connector.

8. The vortex flowmeter of claim 5 wherein said housing further comprises a circuit compartment pivotally connected to said yoke.

9. The vortex flowmeter of claim 8 wherein said circuit compartment comprises a first portion for housing flowmeter circuitry, and a separate second portion for housing externally accessible field connections.

10. A vortex flowmeter for measuring the flow rate of a fluid in a fluid flow conduit, said vortex flowmeter comprising:
    a bluff body conduit connector coupled into said fluid flow conduit and containing a bluff body disposed to produce vortices in the flow of fluid;
    a single-piece yoke dimensioned to slip about and removably mate with said bluff body conduit connector, said yoke being formed to slip about and removably mate with said bluff body conduit connector in a direction transverse to the direction of the fluid flow;
    an ultrasonic transmitter and receiver disposed within said yoke so as to be respectively positioned on opposing sides of said bluff body conduit connector, and with said transmitter propagating an ultrasonic wave through said vortices for receipt by said receiver;
    a phase detector means connected to said transmitter and receiver for producing an output representative of any phase difference between the transmitted wave and the received wave; and
    a processor means responsive to said phase detector means output for determining the fluid flow rate as a function of the phase difference caused by said vortices.

11. The vortex flowmeter of claim 10 further comprising:
    an optimal phase range detecting means connected to said phase detector means for detecting if said phase difference is approximately 0 degrees or 180 degrees; and
    a phase shifting means connected to said optimal phase range detecting means for shifting the phase of the transmitter signal supplied to said phase detecting means by substantially 90 degrees.

12. The vortex flowmeter of claim 11 wherein said phase detecting means comprises an Exclusive Or gate having an output connected to a means for filtering said output into a DC component representative of the phase difference between the transmitted and received waves, and an AC component representative of the frequency of said vortices.

13. The vortex flowmeter of claim 12 wherein said optimal phase range detecting means is responsive to the amplitude of said DC component to determine if said phase difference is approximately 0 or 180 degrees.

14. The vortex flowmeter of claim 11 wherein said phase shifting means comprises a means for inverting said transmitter signal supplied to said phase detecting means, and a frequency divider for dividing said inverted signal by 2.

15. The vortex flowmeter of claim 10 wherein said yoke is removably fastened about said bluff body conduit connector by a locking mechanism.

16. The vortex flowmeter of claim 10 further comprises a circuit compartment pivotally connected to said yoke.

17. The vortex flowmeter of claim 16 wherein said circuit compartment comprises a first portion for housing flowmeter circuitry, and a separate second portion for housing externally accessible field connections.

18. The vortex flowmeter of claim 10 wherein said yoke is constructed entirely of non-corrosive material.

\* \* \* \* \*